(12) United States Patent
Lee et al.

(10) Patent No.: US 9,276,247 B2
(45) Date of Patent: Mar. 1, 2016

(54) SEPARATOR AND ELECTROCHEMICAL DEVICE COMPRISING THE SAME

(71) Applicant: LG Chem, Ltd., Seoul (KR)

(72) Inventors: Joo-Sung Lee, Daejeon (KR); Jeong-Min Ha, Daejeon (KR); Sun-Mi Jin, Daejeon (KR); Bo-Kyung Ryu, Daejeon (KR); Jong-Hun Kim, Daejeon (KR)

(73) Assignees: LG CHEM, LTD., Seoul (KR); TORAY BATTERY SEPARATOR FILM CO., LTD., Nasushiobara-shi (JP)

( * ) Notice: Subject to any disclaimer, the term of this patent is extended or adjusted under 35 U.S.C. 154(b) by 0 days.

(21) Appl. No.: 13/688,401

(22) Filed: Nov. 29, 2012

(65) Prior Publication Data

US 2013/0084483 A1 Apr. 4, 2013

Related U.S. Application Data

(63) Continuation of application No. PCT/KR2011/009266, filed on Dec. 1, 2011.

(30) Foreign Application Priority Data

Apr. 6, 2011 (KR) .................. 10-2011-0031829
Nov. 30, 2011 (KR) .................. 10-2011-0127155

(51) Int. Cl.
*H01M 2/18* (2006.01)
*H01M 2/16* (2006.01)
*H01M 10/052* (2010.01)

(52) U.S. Cl.
CPC ............... *H01M 2/18* (2013.01); *H01M 2/166* (2013.01); *H01M 2/1673* (2013.01); *H01M 2/1686* (2013.01); *H01M 10/052* (2013.01); *Y02E 60/122* (2013.01)

(58) Field of Classification Search
CPC . H01M 10/052; H01M 2/166; H01M 2/1673; H01M 2/1686; H01M 2/18; H01M 2/16; Y02E 60/122
USPC .......... 429/247, 250, 251, 129, 142, 144, 143
See application file for complete search history.

(56) References Cited

U.S. PATENT DOCUMENTS 3,159,507 A * 12/1964 Abbe et al. .................. 429/145
5,981,107 A * 11/1999 Hamano et al. .......... 429/231.95

(Continued)

FOREIGN PATENT DOCUMENTS

CN 101267934 A 9/2008
DE 10 2009 055 944 A1 6/2011

(Continued)

OTHER PUBLICATIONS

International Search Report for PCT/KR2011/009266 mailed on Jul. 31, 2012.

(Continued)

*Primary Examiner* — Milton I Cano
*Assistant Examiner* — Ling R Zeng
(74) *Attorney, Agent, or Firm* — Birch, Stewart, Kolasch & Birch, LLP

(57) ABSTRACT

A separator including a porous substrate, and a porous coating layer formed on at least one surface of the porous substrate and including a mixture of inorganic particles and a binder polymer. A continuous or discontinuous patterned layer is formed on the surface of the porous coating layer to allow an electrolyte solution to permeate therethrough. The continuous or discontinuous patterned layer may be formed with continuous grooves to allow an electrolyte solution to permeate therethrough. Due to this structure, the wettability of the separator with an electrolyte solution is improved, shortening the time needed to impregnate the electrolyte solution into the separator.

20 Claims, 3 Drawing Sheets

(56) References Cited

U.S. PATENT DOCUMENTS

| | | | |
|---|---|---|---|
| 6,488,721 B1* | 12/2002 | Carlson | 429/137 |
| 7,875,391 B2 | 1/2011 | Tsutsumi et al. | |
| 8,003,263 B2* | 8/2011 | Kim et al. | 429/303 |
| 2005/0053833 A1* | 3/2005 | Hayashida et al. | 429/209 |
| 2009/0181295 A1 | 7/2009 | Usami et al. | |
| 2009/0291360 A1* | 11/2009 | Kim et al. | 429/145 |
| 2010/0323230 A1 | 12/2010 | Lee et al. | |
| 2011/0064988 A1 | 3/2011 | Yu | |

FOREIGN PATENT DOCUMENTS

| | | |
|---|---|---|
| EP | 0 849 819 A2 | 6/1998 |
| EP | 1 659 650 A1 | 5/2006 |
| EP | 1 935 621 A1 | 6/2008 |
| JP | 2006-12788 A | 1/2006 |
| KR | 10-2003-0010406 A | 2/2003 |
| KR | 10-2006-0063751 A | 6/2006 |
| KR | 10-2007-000231 A | 1/2007 |
| KR | 10-2009-0083854 A | 8/2009 |
| WO | WO 03/012896 A1 | 2/2003 |
| WO | WO 2009/053862 A2 | 4/2009 |

OTHER PUBLICATIONS

Böhnstedt, "Handbook of Battery Materials", HANDBOOK OF BATTERY MATERIALS, Weinheim: Wiley, Jan. 1, 1999, XP-002230615, ISBN: 978-3-527-29469-5, sections 9.1.2; 9.1.2.2; and 9.2.2.1, pp. 245-292.

* cited by examiner

SEPARATOR AND ELECTROCHEMICAL DEVICE COMPRISING THE SAME

CROSS-REFERENCE TO RELATED APPLICATION

The present application is a continuation of International Application No. PCT/KR2011/009,266 filed on Dec. 1, 2011, which claims priority to Korean Patent Application No. 10-2011-0,031,829 filed on Apr. 6, 2011 and Korean Patent Application No. 10-2011-0,127,155 filed on Nov. 30, 2011 in the Republic of Korea, the disclosures of which are incorporated herein by reference.

TECHNICAL FIELD

The present disclosure relates to a separator including a porous coating layer into which a continuous or discontinuous patterned layer is introduced to allow an electrolyte solution to permeate therethrough, achieving improved impregnation with the electrolyte solution, and an electrochemical device including the separator.

BACKGROUND ART

Recently, there has been growing interest in energy storage technologies. As the application fields of energy storage technologies have been extended to mobile phones, camcorders, notebook computers and even electric cars, efforts have increasingly been made towards the research and development of electrochemical devices. In this aspect, electrochemical devices have attracted the most attention. The development of secondary batteries capable of repeatedly charging and discharging has been the focus of particular interest. In recent years, extensive research and development has been conducted to design new electrodes and batteries for the purpose of improving capacity density and specific energy of the batteries.

Many secondary batteries are currently available. Lithium secondary batteries developed in the early 1990's have received a great deal of attention due to their advantages of higher operating voltages and much higher energy densities than conventional batteries using aqueous electrolyte solutions, such as Ni—MH batteries, Ni—Cd batteries and $H_2SO_4$—Pb batteries. However, such lithium ion batteries suffer from safety problems, such as fire or explosion, encountered with the use of organic electrolytes and are disadvantageously complicated to fabricate. In attempts to overcome the disadvantages of lithium ion batteries, lithium ion polymer batteries have been developed as next-generation batteries. However, additional research is still urgently needed to improve the relatively low capacities and insufficient low-temperature discharge capacities of lithium ion polymer batteries in comparison with lithium ion batteries.

Many companies have produced a variety of electrochemical devices with different safety characteristics. It is very important to ensure the safety of such electrochemical devices. The most important consideration for safety is that operational failure or malfunction of electrochemical devices should not cause injury to users. For this purpose, safety regulations strictly prohibit the dangers (such as fire and smoke) of electrochemical devices. In connection with the safety characteristics of a lithium secondary battery including a separator, overheating of the lithium secondary battery may cause thermal runaway or puncture of the separator may pose an increased risk of explosion. In particular, a porous polyolefin substrate commonly used as a separator of a lithium secondary battery undergoes extreme thermal shrinkage at a temperature of 100° C. or higher due to its material characteristics and production processes including elongation. This thermal shrinkage behavior may cause short circuits between a cathode and an anode.

Various proposals have been made to solve the above safety problems of electrochemical devices. For example, Korean Unexamined Patent Publication No. 10-2007-231 discloses a separator which includes a porous organic-inorganic coating layer formed by coating a mixture of inorganic particles and a binder polymer on at least one surface of a porous substrate. However, it takes a long time for an electrolyte solution to be impregnated into the separator including the porous organic-inorganic coating layer because the separator exhibits a low affinity for the electrolyte solution. The impregnation of the separator with an electrolyte solution is particularly time-consuming in a large-capacity electrochemical device, which makes the fabrication of the electrochemical device difficult. Accordingly, there is an urgent need to improve the impregnation properties of separators with electrolyte solutions.

DISCLOSURE

Technical Problem

The present disclosure is designed to solve the problems of the prior art, and therefore it is an object of the present disclosure to provide a separator with excellent electrolyte impregnation properties including a porous organic-inorganic coating layer, and an electrochemical device including the separator.

Technical Solution

In order to achieve the above object, there is provided a separator including: a porous substrate, and a porous coating layer formed on at least one surface of the porous substrate and comprising a mixture of inorganic particles and a binder polymer, wherein a continuous or discontinuous patterned layer with continuous or discontinuous grooves is formed on the surface of the porous coating layer to allow an electrolyte solution to permeate therethrough.

Preferably, the grooves have a depth corresponding to 1 to 20% of the thickness of the porous coating layer and have a width of 0.1 to 50 mm.

The porous substrate may be a porous polyolefin substrate. A preferred material for the porous polyolefin substrate is selected from the group consisting of polyethylene, polypropylene, polybutylene and polypentene.

The inorganic particles may be selected from the group consisting of inorganic particles having a dielectric constant of at least 5, inorganic particles having the ability to transport lithium ions, and mixtures thereof. There is no particular restriction on the kind of the inorganic particles having a dielectric constant of at least 5. As the inorganic particles having a dielectric constant of at least 5, preferred are $BaTiO_3$, $Pb(Zr_x,Ti_{1-x})O_3$ (PZT, 0<x<1), $Pb_{1-x}La_xZr_{1-y}Ti_yO_3$ (PLZT, 0<x<1, 0<y<1), $(1-x)Pb(Mg_{1/3}Nb_{2/3})O_{3-x}PbTiO_3$ (PMN-PT, 0<x<1), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC or $TiO_2$ particles. Examples of the inorganic particles having the ability to transport lithium ions include, but are not limited to, lithium phosphate ($Li_3PO_4$) particles, lithium titanium phosphate ($Li_xTi_y(PO_4)_3$, 0<x<2, 0<y<3) particles, lithium aluminum titanium phosphate ($Li_xAl_yTi_z(PO_4)_3$, 0<x<2, 0<y<1, 0<z<3) particles, $(LiAlTiP)_xO_y$ type glass (0<x<4, 0<y<13) particles, lithium lanthanum titanate ($Li_xLa_yTiO_3$, 0<x<2, 0<y<3) particles, lithium germanium thiophosphate ($Li_xGe_yP_zS_w$, 0<x<4, 0<y<1, 0<z<1, 0<w<5) particles, lithium nitride ($Li_xN_y$, 0<x<4, 0<y<2) particles, $SiS_2$ type glass ($Li_xSi_yS_z$ 0<x<3, 0<y<2, 0<z<4) particles, and $P_2S_5$ type glass ($Li_xP_yS_z$, 0<x<3, 0<y<3, 0<z<7) particles.

There is no particular restriction on the kind of the binder polymer. For example, the binder polymer may be polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinyl acetate, polyvinyl alcohol, polyethylene-co-vinyl acetate, polyethylene oxide, polyarylate, styrene butadiene rubber, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose, or a low molecular weight compound having a molecular weight of 10,000 g/mol or lower.

Preferably, the inorganic particles and the binder polymer are used in a weight ratio of 50:50 to 99:1.

The separator of the present disclosure is suitable for use in an electrochemical device including a cathode and an anode. The separator of the present disclosure is interposed between the cathode and the anode of the electrochemical device. Particularly, the separator of the present disclosure can be used in a lithium secondary battery.

Advantageous Effects

A continuous or discontinuous patterned layer formed with continuous grooves is formed on the porous coating layer of the separator according to the present disclosure to allow an electrolyte solution to permeate therethrough. Due to this structure, the wettability of the separator with an electrolyte solution is improved, shortening the time needed to impregnate the electrolyte solution into the separator. In addition, the formation of the porous coating layer makes the separator of the present disclosure highly resistant to heat.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Figure 1:
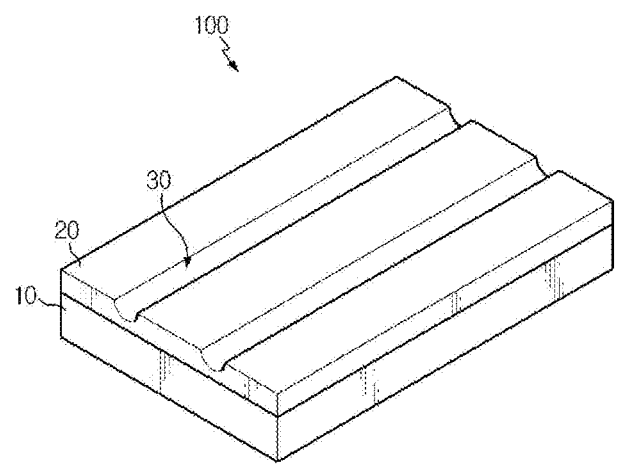
FIG. 1 is a perspective view of a separator including a porous coating layer formed with grooves according to an embodiment of the present disclosure.
Figure 2:
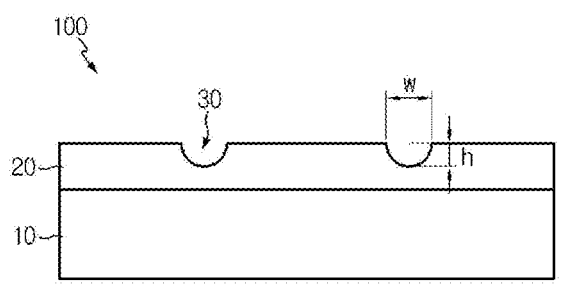
FIG. 2 is a cross-sectional view of a separator including a porous coating layer formed with grooves according to an embodiment of the present disclosure.

A separator according to a preferred embodiment of the present disclosure is illustrated in FIGS. 1 and 2. However, the description proposed herein is just a preferable example for the purpose of illustrations only, not intended to limit the scope of the disclosure, so it should be understood that other equivalents and modifications could be made at the time of filing the present application.

The present disclosure provides a separator including: a porous substrate; and a porous coating layer formed on at least one surface of the porous substrate and including a mixture of inorganic particles and a binder polymer.

There is no particular restriction on the kind of the porous substrate. As the porous substrate, there may be used, for example, a membrane or a non-woven fabric. The porous substrate may be a porous polyolefin substrate. A preferred material for the porous polyolefin substrate is selected from the group consisting of polyethylene, polypropylene, polybutylene and polypentene. In the porous coating layer, the binder polymer attaches (that is, connects and fixes) the inorganic particles to each other so as to maintain a state in which the inorganic particles are bound to each other. Another function of the binder polymer is to maintain a state in which the porous coating layer is bound to the porous substrate. The inorganic particles of the porous coating layer are in substantial contact with each other and exist in a packed structure. Interstitial volumes created between the inorganic particles in contact with each other become pores of the porous coating layer.

The separator including the porous coating layer is interposed between electrodes to fabricate an electrochemical device. Since the porous substrate and the porous coating layer of the separator have a low affinity for an electrolyte solution, it takes much time for the electrolyte solution to be impregnated into the electrochemical device. Thus, a continuous or discontinuous patterned layer with continuous or discontinuous grooves is introduced through which an electrolyte solution permeates the surface of the porous coating layer to shorten the time for impregnation with the electrolyte solution. The term "continuous" means that the pattern consists of completely closed polygons or irregular figures on the porous substrate. The term "discontinuous" means that the pattern consists of unclosed polygons or irregular figures or the patterned layer is formed on a portion of the porous substrate although the pattern consists of closed polygons or irregular figures. So long as the patterned layer with continuous or discontinuous grooves acts as a path through which an electrolyte solution permeates, it may be modified into any form suitable for achieving the object of the present disclosure.

Referring to FIG. 1, the separator 100 of the present disclosure includes a porous substrate 10 and a porous coating layer 20 formed on at least one surface of the porous substrate 10 and having continuous grooves 30 through which an electrolyte solution permeates to improve the impregnation with the electrolyte solution. There is no restriction on the form of the continuous grooves 30. Preferably, the grooves are in the form of continuous, concave and elongated lines from one cut surface of the separator to the opposite cut surface thereof. Alternatively, the porous coating layer 20 may have grooves in the form of lattices. An electrolyte solution permeates through the continuous grooves 30 exposed to the edges of an electrochemical device and can easily reach inside the separator. That is, the grooves help to impregnate the separator with the electrolyte solution. The cross-sectional shape of the grooves is not particularly limited and may vary depending on the formation method thereof. For example, the grooves may be triangular, quadrangular or semicircular in cross section. For effective impregnation of the separator with an electrolyte solution, it is more preferred that the patterned layer consists of continuous grooves.

Referring to FIG. 2, it is preferred that the depth h of the grooves is from 1 to 20% of the thickness of the porous coating layer. If the grooves are deeper than 20% of the thickness of the porous coating layer, the mechanical properties of the porous coating layer may be impaired, resulting in deterioration of heat resistance, and the separator may be wrinkled due to an irregular thickness variation of the porous coating layer. Meanwhile, if the grooves are shallower than 1% of the thickness of the porous coating layer, an electrolyte solution is difficult to permeate through the porous coating layer. It is preferred that the width w of the grooves is from 0.1 to 50 mm. If the grooves are narrower than 0.1 mm, an electrolyte solution is difficult to infiltrate the porous coating layer, making it difficult to expect an improvement in wettability with the electrolyte solution. Meanwhile, if the grooves are wider than 50 mm, there is the risk that the separator may be wrinkled.

The inorganic particles are not specially limited so long as they are electrochemically stable. In other words, the inorganic particles can be used without particular limitation in the present disclosure if they do not undergo oxidation and/or reduction in an operating voltage range applied to an electrochemical device (for example, 0-5 V for Li/Li$^+$). In particular, the use of inorganic particles having the ability to transport ions can improve the conductivity of ions in an electrochemical device, leading to an improvement in the performance of the electrochemical device.

The use of inorganic particles having a high dielectric constant can contribute to an increase in the degree of dissociation of an electrolyte salt, for example, a lithium salt, in a liquid electrolyte to improve the ionic conductivity of the electrolyte solution.

For these reasons, it is preferred that the inorganic particles are selected from inorganic particles having a dielectric constant of at least 5, preferably at least 10, inorganic particles having the ability to transport lithium ions, and mixtures thereof.

Non-limiting examples of inorganic particles having a dielectric constant of at least 5 include $BaTiO_3$, $Pb(Zr_xTi_{1-x})O_3$ (PZT, $0<x<1$), $Pb_{1-x}La_xZr_{1-y}Ti_yO_3$ (PLZT, $0<x<1$, $0<y<1$),$(1-x)Pb(Mg_{1/3}Nb_{2/3})O_{3-x}PbTiO_3$ (PMN-PT, $0<x<1$), hafnia ($HfO_2$), $SrTiO_3$, $SnO_2$, $CeO_2$, MgO, NiO, CaO, ZnO, $ZrO_2$, $Y_2O_3$, $Al_2O_3$, SiC and $TiO_2$ particles. These inorganic particles may be used alone or as a mixture of two or more thereof.

Particularly preferred are $BaTiO_3$, $Pb(Zr_xTi_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3-xPbTiO_3$ (PMN-PT, $0<x<1$) and hafnia ($HfO_2$) whose dielectric constants are 100 or higher that have piezoelectricity to protect both electrodes from internal short circuits when an external impact is applied, achieving improved safety of an electrochemical device. Piezoelectricity is a phenomenon in which charges are created as a result of tension or compression under a certain pressure to generate a potential difference between opposite sides. The use of a mixture of the inorganic particles having a high dielectric constant and the inorganic particles having the ability to transport lithium ions will produce enhanced synergistic effects.

The inorganic particles having the ability to transport lithium ions refer to those that contain lithium atoms and have the function of transferring lithium ions without storing the lithium. The inorganic particles having the ability to transport lithium ions contain defects in their structure through which lithium ions can be transferred and moved. Due to the presence of the defects, the conductivity of lithium ions in a battery can be improved, resulting in improved battery performance. Non-limiting examples of the inorganic particles having the ability to transport lithium ions include lithium phosphate ($Li_3PO_4$) particles, lithium titanium phosphate ($Li_xTi_y(PO_4)_3$, $0<x<2$, $0<y<3$) particles, lithium aluminum titanium phosphate ($Li_xAl_yTi_z(PO_4)_3$, $0<x<2$, $0<y<1$, $0<z<3$) particles, $(LiAlTiP)_xO_y$ type glass ($0<x<4$, $0<y<13$) particles such as $14Li_2O$—$9Al_2O_3$—$38TiO_2$—$39P_2O_5$ particles, lithium lanthanum titanate ($Li_xLa_yTiO_3$, $0<x<2$, $0<y<3$) particles, lithium germanium thiophosphate ($Li_xGe_yP_zS_w$, $0<x<4$, $0<y<1$, $0<z<1$, $0<w<5$) particles such as $Li_{3.25}Ge_{0.25}P_{0.75}S_4$ particles, lithium nitride ($Li_xN_y$, $0<x<4$, $0<y<2$) particles such as $Li_3N$ particles, $SiS_2$ type glass ($Li_xSi_yS_z$, $0<x<3$, $0<y<2$, $0<z<4$) particles such as $Li_3PO_4$—$Li_2S$—$SiS_2$ particles, and $P_2S_5$ type glass ($Li_xP_yS_z$, $0<x<3$, $0<y<3$, $0<z<7$) particles such as $LiI$—$Li_2S$—$P_2S_5$ particles. These inorganic particles may be used alone or as a mixture thereof.

The size of the inorganic particles present in the porous coating layer is not limited but is preferably in the range of 0.001 to 10 μm. If the inorganic particles are smaller than 0.001 μm, the dispersibility of the inorganic particles may deteriorate, which makes it difficult to control the physical properties of the separator. Meanwhile, if the inorganic particles are larger than 10 μm, the mechanical properties of the separator may deteriorate.

Preferably, the binder polymer is used in an amount of 1 to 50% by weight, based on the inorganic particles. If the amount of the binder polymer used is less than 1% by weight, the inorganic particles cannot be sufficiently bound to each other. Meanwhile, if the amount of the binder polymer used exceeds 50% by weight, the porosity of the porous coating layer may be lowered, resulting in deterioration of wettability with an electrolyte solution.

There is no particular restriction on the kind of the binder polymer. For example, the binder polymer may be polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinyl acetate, polyvinyl alcohol, polyethylene-co-vinyl acetate, polyethylene oxide, polyarylate, styrene butadiene rubber, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose, or a low molecular weight compound having a molecular weight of 10,000 g/mol or lower.

The separator of the present disclosure can be produced by the following procedures.

The binder polymer is dissolved in a solvent. The inorganic particles are mixed with the solution of the binder polymer to prepare a slurry. The slurry is intermittently coated on the surface of the porous substrate to form continuous grooves spaced at regular intervals. As an alternative, the slurry is primarily applied to the surface of the porous substrate to form a porous coating layer, and the binder polymer solution is secondarily coated on the porous coating layer to form continuous grooves. The binder polymer solution may optionally include the inorganic particles. The binder polymer may be used in a molten state. No particular limitation is imposed on the method for coating the slurry. That is, the slurry may be coated by methods generally used in the art. For example, the slurry and the binder may be sequentially coated by various methods, such as dip-dip coating, dip-slot coating, dip-slide coating, dip-roll printing, dip-micro gravure coating, dip-spray coating, dip-inkjet coating, slot-slot coating, slot-slide coating, slot-roll printing, slot-micro gravure coating, slot-spray coating and slot-inkjet spray coating. On the other hand, the slurry and the binder may be simultaneously coated by various methods, such as multilayer slot die coating, multilayer slide-slot coating and multilayer slide coating. In the sequential coating for the formation of a pattern shape, after the primary application of the slurry, it is particularly preferred to perform the secondary coating by slot coating, slide coating, roll printing, micro gravure coating, spray coating, inkjet spray coating, etc. For simultaneous coating of the slurry and the binder, multilayer slot die coating, multilayer slide-slot coating or multilayer slide coating is preferred.

The binder polymer may be as mentioned above.

The separator of the present disclosure is suitable for use in an electrochemical device. That is, the separator of the present disclosure can be interposed between a cathode and an anode of an electrochemical device. The electrochemical device includes all devices in which electrochemical reactions occur. Specific examples of such electrochemical devices include all kinds of primary batteries, secondary batteries, fuel cells, solar cells, and capacitors such as supercapacitors. Particularly preferred are lithium secondary batteries, including lithium metal secondary batteries, lithium ion secondary batteries, lithium polymer secondary batteries and lithium ion polymer secondary batteries.

The electrochemical device can be fabricated by suitable methods known in the art. In an embodiment, the electrochemical device may be fabricated by interposing the separator between a cathode and an anode, assembling the electrode structure, and injecting an electrolyte solution into the electrode assembly.

There is no particular restriction on the production method of the cathode and the anode to be applied together with the separator of the present disclosure. Each of the electrodes can be produced by binding an electrode active material to an electrode current collector by suitable methods known in the art. The cathode active material may be any of those that are commonly used in cathodes of conventional electrochemical devices. Non-limiting examples of particularly preferred cathode active materials include lithium manganese oxides, lithium cobalt oxides, lithium nickel oxides, lithium iron oxides, and lithium composite oxides thereof. The anode active material may be any of those that are commonly used in anodes of conventional electrochemical devices. Non-limiting examples of particularly preferred anode active materials include lithium, lithium alloys, and lithium intercalation materials, such as carbon, petroleum coke, activated carbon, graphite and other carbon materials. Non-limiting examples of cathode current collectors suitable for use in the cathode include aluminum foils, nickel foils, and combinations thereof. Non-limiting examples of anode current collectors suitable for use in the anode include copper foils, gold foils, nickel foils, copper alloy foils, and combinations thereof.

The electrochemical device can use an electrolyte solution consisting of a salt and an organic solvent capable of dissolving or dissociating the salt. The salt has a structure represented by $A^+B^-$ wherein $A^+$ is an alkali metal cation, such as $Li^+$, $Na^+$, $K^+$ or a combination thereof, and $B^-$ is an anion, such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof. Examples of organic solvents suitable for dissolving or dissociating the salt include, but are not limited to, propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC) and γ-butyrolactone. These organic solvents may be used alone or as a mixture thereof.

The electrolyte solution may be injected in any suitable step during fabrication of the battery depending on the manufacturing processes and desired physical properties of a final product. Specifically, the electrolyte solution may be injected before battery assembly or in the final step of battery assembly.

The separator of the present disclosure may be interposed between the cathode and the anode of the secondary battery. When it is intended to assemble a plurality of cells or electrodes to construct an electrode assembly, the separator of the present disclosure may be interposed between the adjacent cells or electrodes. The electrode assembly may have various structures, such as simple stack, jelly-roll and stack-folding types.

In an embodiment, an electrode assembly may be constructed by interposing the separator of the present disclosure between a cathode and an anode, to which corresponding active materials are applied, and continuously winding the cathode/separator/anode structure. Alternatively, an electrode assembly may be constructed by bending the cathode/separator/anode structure at regular intervals so as to have a zigzag folded shape. For higher capacity, the wound or bent electrode assembly may include a plurality of electrodes and separators laminated alternately.

In another embodiment, an electrode assembly may be constructed by laminating cathode/separator/anode or anode/separator/cathode structures as repeating units. Each of the separators of the electrode assembly may be the separator of the present disclosure.

In an embodiment, an electrode assembly may be constructed by assembling a plurality of unit cells having a full cell or bicell structure with a folding film. The folding film may be a general insulating film or the separator of the present disclosure. The full cell structure refers to a cell structure including at least one cell structure in which a separator is interposed between electrodes having opposite polarities and the outermost electrodes have polarities opposite to each other. Examples of such full cell structures include cathode/separator/anode and cathode/separator/anode/separator/cathode/separator/anode structures. The bicell structure refers to a cell structure including at least one cell structure in which a separator is interposed between electrodes having opposite polarities and the outermost electrodes have the same polarity. Examples of such bicell structures include cathode/separator/anode/separator/cathode and anode/separator/c athode/separator/anode structures.

Many methods are possible to assemble unit cells using folding films. As an example, an electrode assembly may be constructed by arranging a plurality of unit cells at predetermined intervals on one surface of a folding film extending in the lengthwise direction, and winding the folding film together with the unit cells in one direction. The electrode assembly has a structure in which the unit cells are inserted into a space defined by the wound folding film. As another example, an electrode assembly may be constructed by arranging a plurality of unit cells at predetermined intervals on both surfaces of a folding film extending in the lengthwise direction, and winding the folding film together with the unit cells in one direction. The electrode assembly thus constructed has a structure in which the unit cells are inserted into a space defined by the wound folding film. The intervals between the arranged unit cells and the polarities of the outermost electrodes of each unit cell are selected such that the electrode of the upper cell in contact with the folding film has a polarity opposite to that of the electrode of the lower cell in contact with the folding film. As an example, the intervals between the arranged unit cells and the polarities of the outermost electrodes of each unit cell may be selected such that the electrode assembly has a cathode/separator/anode/folding film/cathode/separator/anode/folding film/cathode . . . structure.

As another example, an electrode assembly may be constructed by arranging a plurality of unit cells at predetermined intervals on one surface of a folding film extending in the lengthwise direction, and bending the folding film together with the unit cells in a zigzag configuration to arrange the unit cells between the bent portions of the folding film. The electrode assembly thus constructed has a structure in which the unit cells are inserted into the bent and laminated portions of the folding film. As another example, an electrode assembly may be constructed by arranging a plurality of unit cells at predetermined intervals on both surfaces of a folding film extending in the lengthwise direction, and bending the folding film together with the unit cells in a zigzag configuration to arrange the unit cells between the bent portions of the folding film. The electrode assembly thus constructed has a structure in which the unit cells are inserted into the bent and laminated portions of the folding film. The intervals between the arranged unit cells and the polarities of the outermost electrodes of each unit cell are selected such that the electrode of the upper cell in contact with the folding film has a polarity opposite to that of the electrode of the lower cell in contact with the folding film. As an example, the intervals between the arranged unit cells and the polarities of the outermost electrodes of each unit cell may be selected such that the electrode assembly has a cathode/separator/anode/folding film/cathode/separator/anode/folding film/cathode . . . structure.

Many methods are possible to assemble unit cells using folding films. As an example, an electrode assembly may be constructed by arranging an anode, a cathode, an anode, a cathode . . . alternately in this order on one surface of a folding film, and winding the folding film together with the electrodes in one direction. The electrode assembly thus constructed has a structure in which the electrodes are inserted into a space defined by the wound folding film. As another example, an electrode assembly may be constructed by arranging a plurality of electrodes at predetermined intervals on both surfaces of a folding film extending in the lengthwise direction, and winding the folding film together with the electrodes in one direction. The electrode assembly thus constructed has a structure in which the electrodes are inserted into a space defined by the wound folding film. The intervals between the arranged electrodes and the polarities of the electrodes are selected such that the upper electrodes in contact with the folding film have polarities opposite to those of the lower electrodes in contact with the folding film. As an example, the intervals between the arranged unit cells and the polarities of the electrodes may be selected such that the electrode assembly has a cathode/folding film/anode/folding film/cathode . . . structure. As another example, an electrode assembly may be constructed by arranging an anode, a cathode, an anode, a cathode . . . alternately in this order on one surface of a folding film, and bending the folding film together with the electrodes in one direction to arrange the electrodes between the bent portions of the folding film. The electrode assembly thus constructed has a structure in which the electrodes are inserted between the bent and laminated portions of the folding film. As another example, an electrode assembly may be constructed by arranging a plurality of electrodes at predetermined intervals on both surfaces of a folding film extending in the lengthwise direction, and bending the folding film together with the electrodes to arrange the electrodes between the bent portions of the folding film. The electrode assembly thus constructed has a structure in which the electrodes are inserted between the bent and laminated portions of the folding film. The intervals between the arranged electrodes and the polarities of the electrodes are selected such that the upper electrodes in contact with the folding film have polarities opposite to those of the lower electrodes in contact with the folding film. As an example, the intervals between the arranged electrodes and the polarities of the electrodes may be selected such that the electrode assembly has a cathode/folding film/anode/folding film/cathode . . . structure.

On the other hand, the length of each of the folding films used for the construction of the electrode assemblies may be selected so as to wrap the electrode assembly at least once after assembly of the last unit cell or electrode by the method explained above. The electrode assemblies may be modified into various different forms and the scope of the present disclosure is not limited thereto.

Hereinafter, embodiments of the present disclosure will be described in detail. The embodiments of the present disclosure, however, may take several other forms, and the scope of the present disclosure should not be construed as being limited to the following examples. The embodiments of the present disclosure are provided to more fully explain the present disclosure to those having ordinary knowledge in the art to which the present disclosure pertains.

EXAMPLES

Example 1

Production of Separator Including Porous Coating Layer Formed with Grooves

Polyvinylidene fluoride-co-chlorotrifluoroethylene (PVdF-CTFE) and cyanoethylpullulan in a weight ratio of 10:2 were added to and dissolved in acetone at 50° C. for about 12 hr. $Al_2O_3$ powder was added to the polymer solution such that the ratio of the weight of the polymers to the weight of the inorganic particles was 5:95. The inorganic particles were crushed and dispersed in the solution by ball milling for 12 hr to prepare a slurry. The inorganic particles of the slurry had an average particle size of 600 nm.

Figure 3:
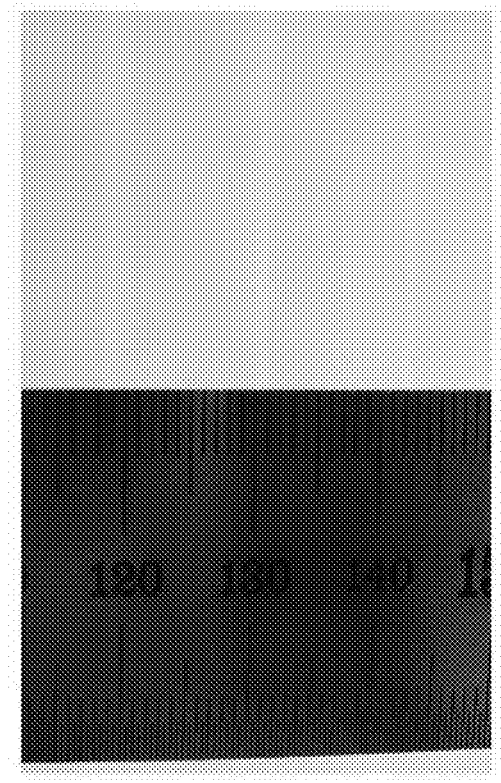
FIG. 3 is an image of a separator including a porous coating layer formed with grooves produced in Example 1.
Figure 4:
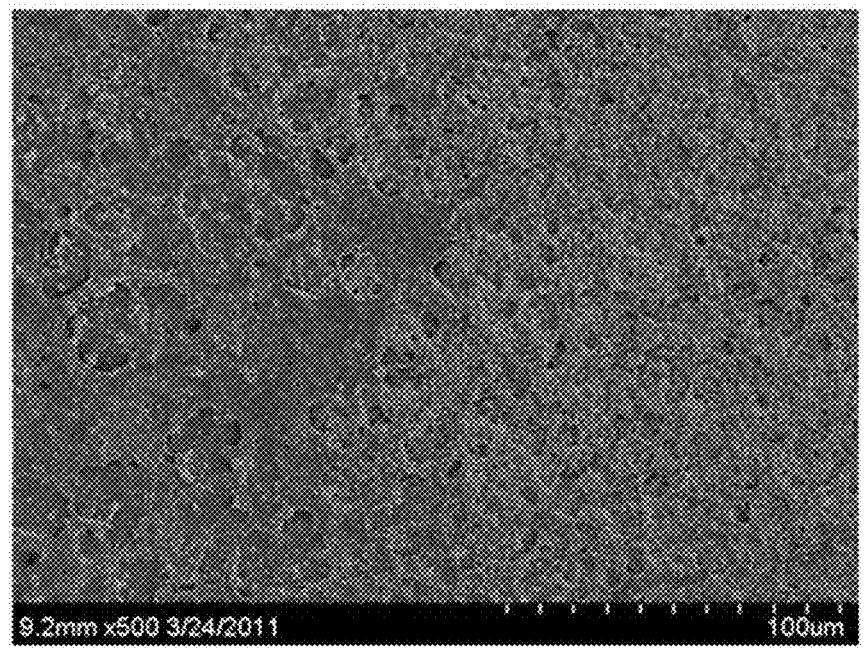
FIG. 4 is a SEM image showing the border of a groove formed in a porous coating layer of a separator produced in Example 1.

The slurry was continuously supplied and coated to a thickness of 4 μm on a 16 μm thick porous polyolefin membrane (C210, Celgard) as a substrate by using a multilayer slot coater to form a lower coating layer, and then a solution of 4 wt % of PVdF-CPFE in acetone was coated on the lower coating layer while passing through diaphragms in 12 mm wide slits to form uncoated portions having grooves in the form of stripes. The areas coated with the binder solution had a thickness of 0.5 μm. That is, the depth of the grooves corresponds to 11% of the total thickness of the porous coating layer. The grooves had a width of 11 mm. The grooves in the form of stripes are shown in FIG. 3. FIG. 4 is a SEM image showing the border of one of the grooves.

Example 2

Production of Separator Including Porous Coating Layer Formed with Grooves

Figure 5:
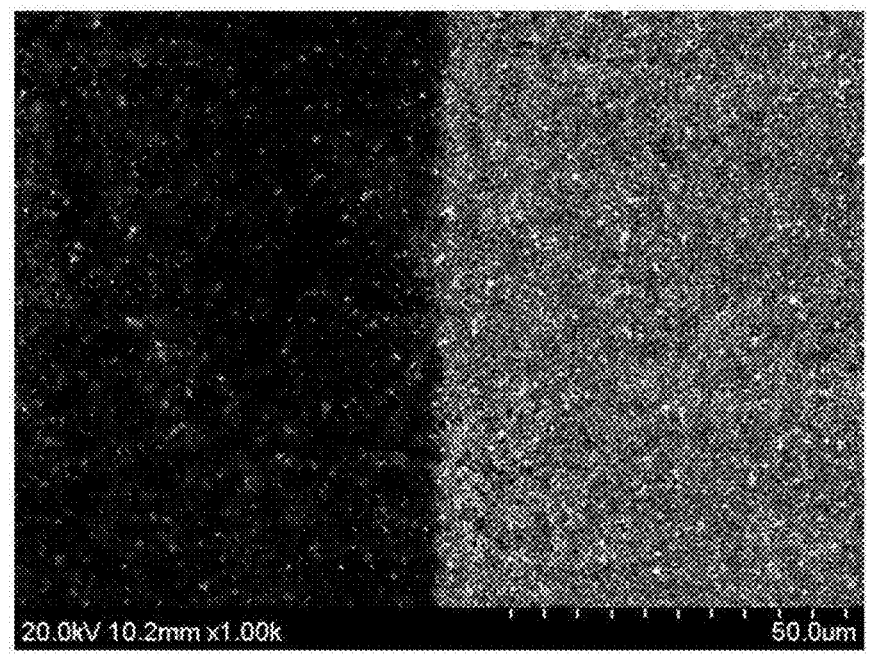
FIG. 5 is a SEM image showing the border of a groove formed in a porous coating layer of a separator produced in Example 2.

A separator was produced in the same manner as in Example 1, except that a solution of 5 wt % of styrene butadiene rubber (SBR) in water was coated on the lower coating layer formed on a 16 μm thick porous polyolefin membrane (C210, Celgard) as a substrate by using a multilayer slot coater to form an upper coating layer formed with grooves. FIG. 5 is a SEM image showing the border of one of the grooves.

Comparative Example 1

Production of Separator Including Porous Coating Layer Formed with No Grooves

Polyvinylidene fluoride-co-chlorotrifluoroethylene (PVdF-CTFE) and cyanoethylpullulan in a weight ratio of 10:2 were added to and dissolved in acetone at 50° C. for about 12 hr. $Al_2O_3$ powder was added to the polymer solution such that the ratio of the weight of the polymers to the weight of the inorganic particles was 5:95. The inorganic particles were crushed and dispersed in the solution by ball milling for 12 hr to prepare a slurry. The inorganic particles of the slurry had an average particle size of 600 nm.

The slurry was continuously supplied and coated to a thickness of 4 μm on a 16 μm thick porous polyolefin membrane (C210, Celgard) as a substrate by using a multilayer slot coater to form a lower coating layer, and then a solution of 4 wt % of PVdF-CTFE was coated on the lower coating layer to form a continuous coating layer having a thickness of 0.5 μm. That is, the thickness of the upper coating layer portion corresponds to 11% of the total thickness of the porous coating layer.

Test Example 1

Measurement of Wettability of Batteries with Electrolyte Solution

A stacks cell was fabricated using each of the separators produced in Examples 1-2 and Comparative Example 1 by the following procedure. First, an anode was interposed between two sheets of separators. Then, cathodes were positioned on both outer surfaces of the separators, followed by lamination at a temperature of 100° C. to fabricate a stack cell.

One edge of the stack cell was dipped in an electrolyte solution. Two hours after dipping, the height of the electrolyte solution impregnated into the stack cell was measured. The results are shown in Table 1.

TABLE 1

|  | Height of electrolyte solution impregnated (mm) |
|---|---|
| Example 1 | 92 |
| Example 2 | 84 |
| Comparative Example 1 | 67 |

As can be seen from the results in Table 1, the heights of the electrolyte solution impregnated into the stack cells using the separators of Examples 1-2 and Comparative Example 1 were 92 mm, 84 mm and 67 mm, respectively. These results indicate that the stack cells using the separators of Examples 12, each of which had grooves formed on the surface thereof, were better in terms of electrolyte solution wettability than the stack cell using the separator of Comparative Example 1.

Explanation of Reference Numerals

| 100: Separator | 10: Porous substrate |
|---|---|
| 20: Porous coating layer | 30: Grooves |

What is claimed is:

1. A separator comprising:
    a porous substrate,
    a porous coating layer comprising inorganic particles formed on at least one surface of the porous substrate and comprising a mixture of inorganic particles and a binder polymer, and
    a continuous or discontinuous binder polymer patterned layer present on the surface of the porous coating layer,
    wherein the patterned layer comprises coated portions and uncoated portions on said porous coating layer,
    wherein the uncoated portions form continuous or discontinuous grooves between the coated portions, and
    wherein the grooves have a width of 0.1 to 50 mm.

2. The separator according to claim 1, wherein the grooves have a depth corresponding to 1 to 20% of the thickness of the porous coating layer.

3. The separator according to claim 1, wherein the grooves have a width of 11 to 50 mm.

4. The separator according to claim 1, wherein the porous substrate is a porous polyolefin substrate.

5. The separator according to claim 1, wherein the inorganic particles are selected from the group consisting of inorganic particles having a dielectric constant of at least 5, inorganic particles having the ability to transport lithium ions, and mixtures thereof.

6. The separator according to claim 1, wherein the inorganic particles and the binder polymer are used in a weight ratio of 50:50 to 99:1.

7. The separator according to claim 1, wherein the continuous or discontinuous patterned layer comprises a hinder polymer.

8. The separator according to claim 1, wherein the continuous or discontinuous patterned layer comprises a mixture of inorganic particles and a hinder polymer.

9. The separator according to claim 1, wherein the grooves allow an electrolyte solution to permeate therethrough.

10. The separator according to claim 1, wherein the continuous or discontinuous grooves are continuous, concave and elongated lines from one cut surface of the separator to an opposite cut surface of the separator, or lattices.

11. An electrochemical device comprising a cathode, an anode and a separator interposed between the cathode and the anode, wherein the separator includes:
    a porous substrate,
    a porous coating layer comprising inorganic particles formed on at least one surface of the porous substrate and comprising a mixture of inorganic particles and a binder polymer, and
    a continuous or discontinuous binder polymer patterned layer present on the surface of the porous coating layer,
    wherein the patterned layer comprises coated portions and uncoated portions on said porous coating layer,
    wherein the uncoated portions form continuous or discontinuous grooves between the coated portions, and
    wherein the grooves have a width of 0.1 to 50 mm.

12. The electrochemical device according to claim 11, wherein the grooves have a depth corresponding to 1 to 20% of the thickness of the porous coating layer.

13. The electrochemical device according to claim 11, wherein the grooves have a width of 11 to 50 mm.

14. The electrochemical device according to claim 11, wherein the porous substrate is a porous polyolefin substrate.

15. The electrochemical device according to claim 11, wherein the inorganic particles and the hinder polymer are used in a weight ratio of 50:50 to 99:1.

16. The electrochemical device according to claim 11, wherein the electrochemical device is a lithium secondary battery.

17. A separator, comprising:
   a porous substrate, and
   a porous coating layer comprising inorganic particles formed on at least one surface of the porous substrate and comprising a mixture of inorganic particles and a binder polymer,
   wherein the porous coating layer comprises continuous or discontinuous grooves present in the surface thereof,
   wherein the grooves are continuous, concave and elongated lines from one cut surface of the separator to an opposite cut surface of the separator, or lattices, and
   wherein the grooves have a width of 0.1 to 30 mm.

18. The separator according to claim 17, wherein the grooves have a depth corresponding to 1 to 20% of the thickness of the porous coating layer.

19. The separator according to claim 17, wherein the grooves allow an electrolyte solution to permeate therethrough.

20. The separator according to claim 17, wherein the grooves have a width of 11 to 50 mm.

\* \* \* \* \*